(12) United States Patent
Phoboonme

(10) Patent No.: US 11,481,164 B2
(45) Date of Patent: Oct. 25, 2022

(54) SYSTEM AND METHOD FOR MODELING AND IMPLEMENTING PREDICTIVE DEVICE MAINTENANCE

(71) Applicant: Toshiba TEC Kabushiki Kaisha, Shinagawa-ku (JP)

(72) Inventor: Methee Phoboonme, Rancho Santa Margarita, CA (US)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/179,797

(22) Filed: Feb. 19, 2021

(65) Prior Publication Data

US 2022/0269456 A1 Aug. 25, 2022

(51) Int. Cl.
*G06F 3/12* (2006.01)
*G06N 20/00* (2019.01)
*G06Q 10/00* (2012.01)

(52) U.S. Cl.
CPC .......... *G06F 3/1234* (2013.01); *G06F 3/1203* (2013.01); *G06F 3/1287* (2013.01); *G06N 20/00* (2019.01); *G06Q 10/20* (2013.01)

(58) Field of Classification Search
CPC .................................................. G06F 3/1234
USPC ........................................................ 358/1.15
See application file for complete search history.

(56) References Cited

U.S. PATENT DOCUMENTS

| | | | |
|---|---|---|---|
| 2015/0346963 A1* | 12/2015 | Spear | G06F 11/0772 715/733 |
| 2018/0241637 A1* | 8/2018 | Channa | H04L 41/046 |
| 2018/0300198 A1* | 10/2018 | Symington | G06F 11/079 |

* cited by examiner

*Primary Examiner* — Jacky X Zheng
(74) *Attorney, Agent, or Firm* — Ulmer & Berne LLP; John X. Garred

(57) ABSTRACT

A system and method for improved predictive maintenance for multifunction peripherals includes machine learning trained with more accurate problem and resolution coding and categorization. A training set is made from past maintenance records that include accurate problem codes, thorough natural language problem descriptions, accurate resolution codes, thorough problem resolution descriptions and problem/solution categorization. When a service call is received, an operator provides record with a natural language problem description and to which they assign a problem code for categorization. Natural language in the record is compared with records in the training set. When there is a sufficient language match, the problem code and categorization from the training set record is used instead of that which was operator assigned. The corrected record can then be fed to improve predictive maintenance machine learning.

12 Claims, 6 Drawing Sheets

| Misclassified problem code | Problem description | Correct problem code |
|---|---|---|
| CE | ERROR CODE/MSG - MESSAGE: FUSER UNIT - REBOOTED SYSTEM AND DID NOT CLEAR MESSAGE | EC |
| CE | COPY/COLOR QUALITY - CROOKED COPIES | CQ |
| MD | PAPER JAM/MISFEED WON'T PULL PPR FROM THE BTM TRAY & MAKING A HORRIBLE NOISE | PJ |
| IN | PAPER JAM/MISFEED" NOT PULLING PAPER" SANDY 864 -886-4490" LC | PJ |

FIG. 4

SYSTEM AND METHOD FOR MODELING AND IMPLEMENTING PREDICTIVE DEVICE MAINTENANCE

TECHNICAL FIELD

This application relates generally to predictive device maintenance before problems arise. The application relates more particularly to improved predictive device maintenance realized by machine learning performed on correctly classified problems.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

MFPs are complex devices that comprise many working parts, including may moving mechanical parts that are subject to wear and tear. When a problem arises, a customer typically places a call to their device supplier with a description of their problem. The supplier dispatches a technician to repair the device. This can keep an MFP out of service for a considerable time period causing lost productivity.

BRIEF DESCRIPTION OF THE DRAWINGS

Various embodiments will become better understood with regard to the following description, appended claims and accompanying drawings wherein:

FIG. 4 is an example embodiment of operator problem misclassifications;

DETAILED DESCRIPTION

Figure 1:
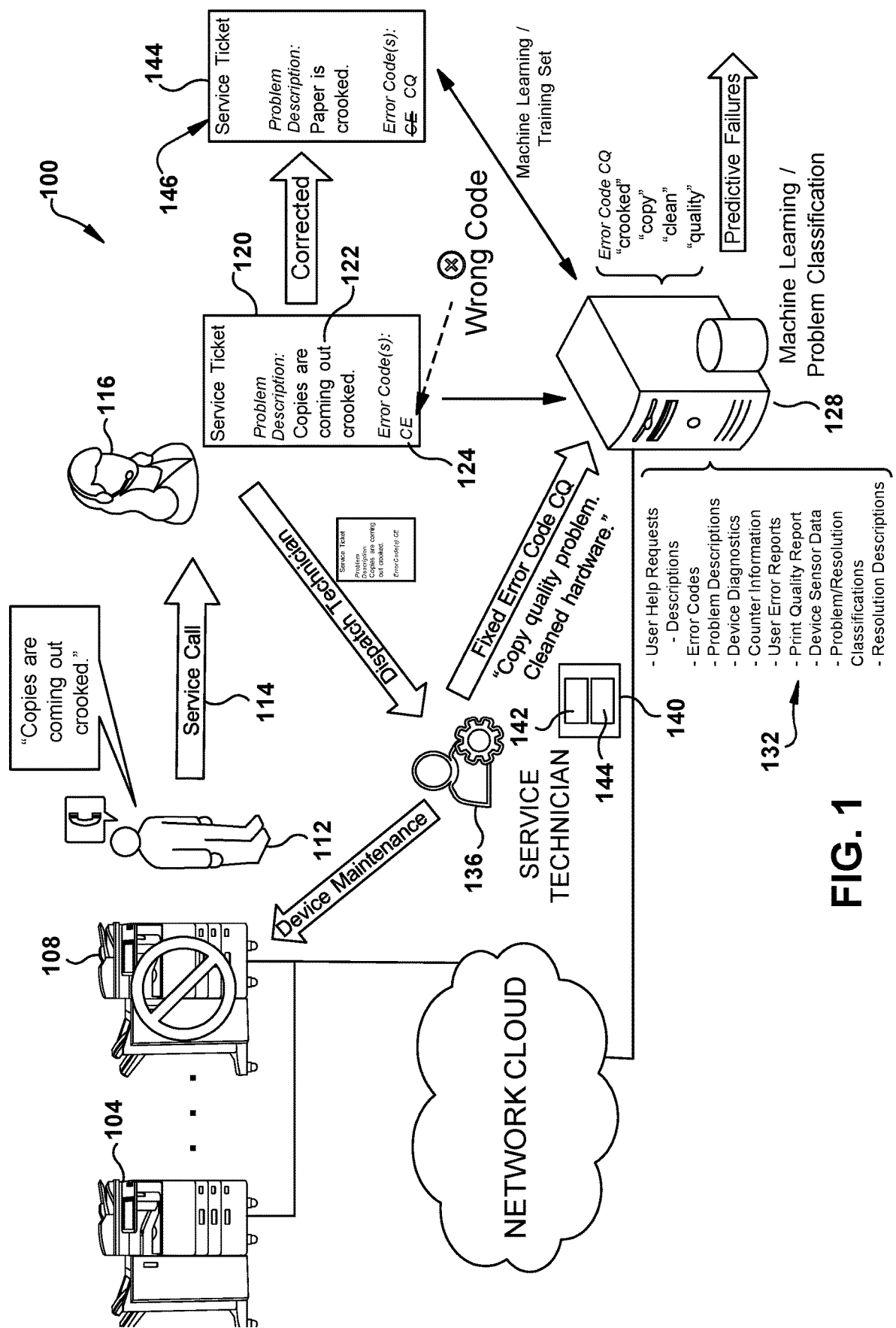
FIG. 1 an example embodiment of a system for modeling and implementing predictive device maintenance for multifunction peripherals.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

As noted above, MFPs will periodically experience operational problems which require dispatching a technician, resulting in costly device downtime. In situations where a company has many MFPs, technicians must be called each time any device fails. This can require many trips, adding considerable maintenance expense.

A solution to the forgoing implements a predictive device maintenance model. See, for example, U.S. Pat. No. 10,447,552, the contents of which are incorporated herein by reference. Accurately identifying maintenance issues in advance of any device problem allows for proactive device servicing, thereby eliminating much device down time. For companies with many MFPs, predictive problems can be identified for many devices. Preemptive servicing of all such devices can be accomplished with a single service call. To be fully effective, service predictions must be accurate. Inaccurate prediction can result in unneeded servicing. This can also result in replacing parts unnecessarily, adding costs for replacement parts and labor, along with machine downtime.

Predictive device maintenance is suitably accomplished via a model based on machine learning. Input for machine learning may include device state information, device error reporting, copy counts, consumable counts, or the like. Predictive maintenance using machine learning may rely on aligning the device data with associated failures. Typically, on a complex device such as MFPs, there will be many classes of failures, user errors, hardware or software. Predictive maintenance uses device data that shows degradation in hardware components in order to predict failures, thus the failures used for machine learning training are typically limited to hardware failures. Additional, valuable machine learning input can be achieved by documenting service calls and service reports. Service call information may include a natural language verbal description given relative to device issues.

Failure descriptions are typically created by a human. They normally originate from customers describing device symptoms. The support staff who receive the customer calls can classify the description into a problem code such as "paper jam" or "copy quality." Then, after a technician is dispatched for device repair, they may assign one or more resolution codes such as "replace part" or "clean hardware" with a detailed description. In some cases, a problem is not fixed in one visit and the customer may call again with a more detail description. Operators and technicians can misclassify the problem/resolution codes. Including such misclassified problems during the machine leaning training will degrade the performance of machine learning models.

Example embodiments herein use natural language processing to analyze symptom and resolution descriptions relative to device failures to classify the problem and resolution. The resultant classification is used to train machine learning for predictive maintenance which can also rely on classification. Problem/resolution classification will give an associated set of failures for model training, along with data obtained from the device. Predictive maintenance model performance, before and after using the problem/resolution classification, can be compared and a more accurate model utilized.

Misclassification is a common operator error that can degrade the performance of predictive maintenance by including failures unrelated to hardware in the training data set.

A failure database may include both a problem code and problem description, as well as a resolution code and resolution description. Example embodiments herein provide training of one or more machine learning models to classify the problem based on the description. An initial training set can be built by manually selecting records having good descriptions providing sufficient details to allow for correct problem classification. Associated labels are provided with a correct problem code. Natural language processing cleans the text by removing common English words that do not help to classify. A frequency of remaining words is determined. A classification model is then trained to accurately classify the problem. A trained model is used to predict a problem class and the result is used to extract device data for predictive maintenance model creation. Device date may include any data indicative of an MFP's state, such as counters, error codes, sensor reading, consumable levels, such as toner, paper or ink, power cycling history, or the like.

Embodiments herein provide a predictive maintenance system that, instead of using human classified problem/resolution codes to extract hardware failures to be used for predictive maintenance training, the system uses one or more natural language processing machine learning techniques to classify hardware related failures or resolution based on associated description text.

In accordance with the subject application, FIG. 1 illustrates an example embodiment of a system 100 for modeling and implementing predictive device maintenance for multi-function peripherals or the like. The system is operable on one or more MFPs, including MFPs 104 and 108. In the illustrated example embodiment, MFP 108 has a device issue prompting user 112 to place a service call 114 to operator 116. Operator 116 generates a service or job ticket 120, suitably in tangible or electronic form. Included in job ticket 120 is a verbal description 122 of a device issue as relayed from the user 112. Also included in job ticket 120 is one or more error codes 124, typically supplied by a human such as operator 116. In the illustrated example, error code CE was entered, but is not correct for device issues, as described in verbal description 122. Job ticket 120 data is sent to a machine learning/problem classification system server 128 which accumulates device information, such as information from an earlier job ticket, job ticket classifications, assigned error codes, as well as device information secured from MFPs themselves, such as page counts, toner or ink levels, device errors, and the like.

Device monitoring is suitably accomplished with any suitable device management system. By way of particular example, Toshiba TEC MFP devices are configurable and monitored via their e-BRIDGE CloudConnect (eCC web) interface. e-BRIDGE CloudConnect is an integrated system of embedded and cloud-based applications that provide functionality to support remote monitoring and management of Toshiba MFPs. It enables management of configuration settings through automated interaction. e-BRIDGE CloudConnect gathers service information from connected MFPs, including meter data, to speed issue diagnosis and resolution.

Devices such as MFP 108 provide device state information for application of machine learning and analysis by the machine learning/problem classification system server 128 for predictive device failures by a suitable machine learning platform such as Microsoft Azure. Additional information for such prediction, such as device service log information, is provided by a suitable CMMS (Computerized Maintenance Management System (or Software)), and is sometimes referred to as Enterprise Asset Management (EAM). By way of particular example a CMMS system can be based on CMMS Software, Field Service Software, or Field Force Automation Software provided by Tessaract Corporation.

In the example of FIG. 1, job ticket 120 information, including the verbal description 122 of a device issue as relayed from user 112, as well as the one or more error codes 124, is sent to service technician 136 who is dispatched to service MFP 108. Once servicing is complete, service technician 136 generates a job service report 140, suitably including a natural language verbal resolution description 142 and one or more problem resolution codes 144. This information is associated with job ticket 120 and stored in the machine learning/problem classification system server 128. Prior to storage, however, error code 124 is automatically corrected by the system. Prior problem/resolution tickets provide for comparison of natural language descriptions with natural language portion of the verbal description 122 of job ticket 120. Machine learning is also applied, and once a suitable match has been made, error code 124 is corrected to correspond to error codes of tickets associated with prior tickets that have correct codes. This generates corrected job ticket 146. The resultant problem/resolution information is fed to the machine learning/problem classification system server 128, suitably providing further machine learning training data that is used for predicting future device issues.

Figure 2:
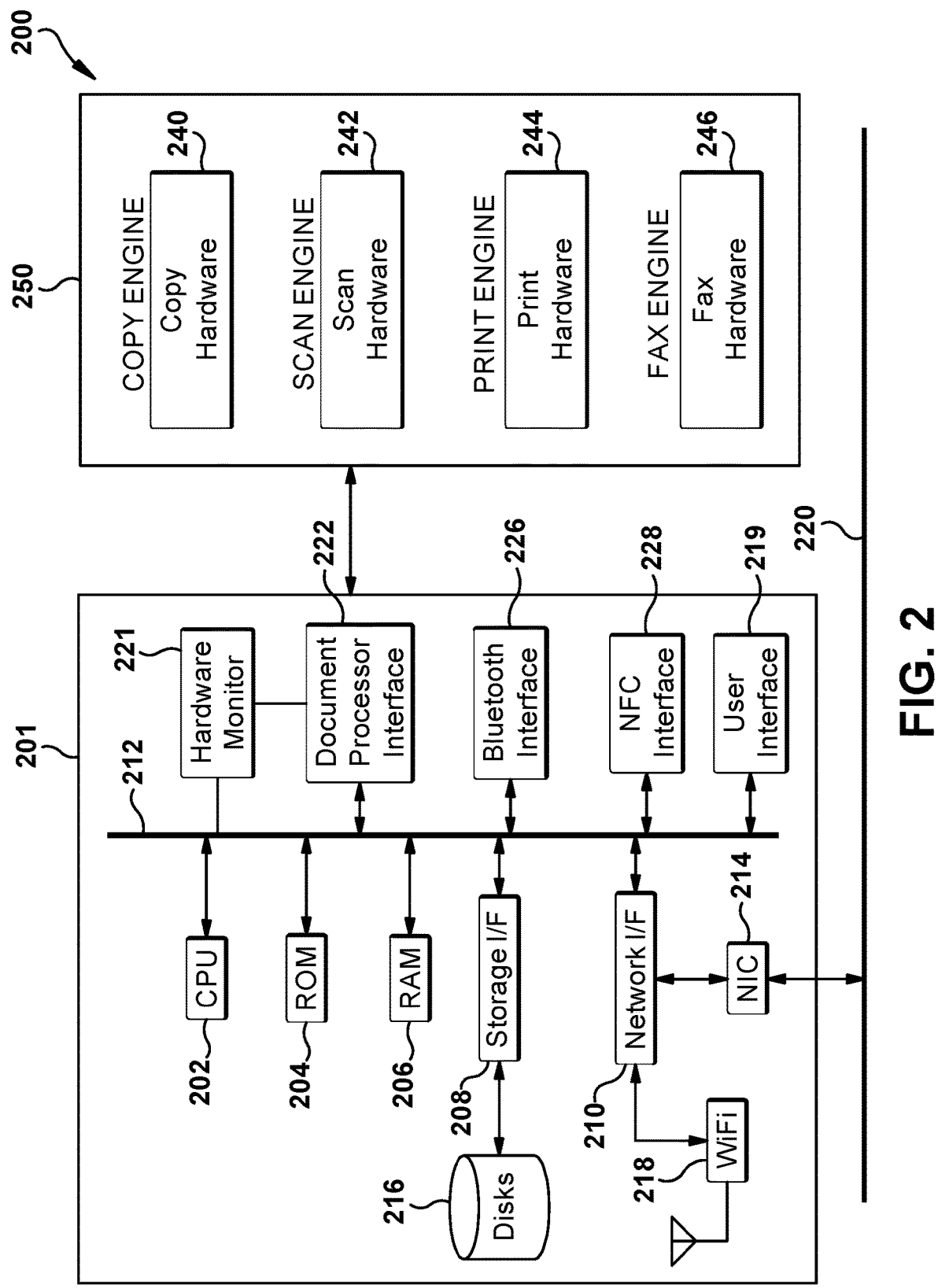
FIG. 2 is an example embodiment of a multifunction peripheral.

Turning now to FIG. 2, illustrated is an example embodiment of a networked digital device comprised of document rendering system 200 suitably comprised within an MFP, such as with MFPs 104 and 108 of FIG. 1. It will be appreciated that an MFP includes an intelligent controller 201 which is itself a computer system. Thus, an MFP can itself function as a server with the capabilities described herein. Included in intelligent controller 201 are one or more processors, such as that illustrated by processor (CPU) 202. Each processor is suitably associated with non-volatile memory, such as read-only memory (ROM) 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired interface or physical network connection 220, or to a wireless data connection via wireless network interface 218. Example wireless data connections include cellular, Wi-Fi, Bluetooth, NFC, wireless universal serial bus (wireless USB), satellite, and the like. Example wired interfaces include Ethernet, USB, IEEE 1394 (FireWire), Lightning, telephone line, or the like.

Processor 202 can also be in data communication with any suitable user input/output (I/O) interface 219 which provides data communication with user peripherals, such as displays, keyboards, mice, track balls, touch screens, or the like.

Also in data communication with data bus 212 is a document processor interface 222 suitable for data communication with the document rendering system 200, including MFP functional units. In the illustrated example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Figure 3:
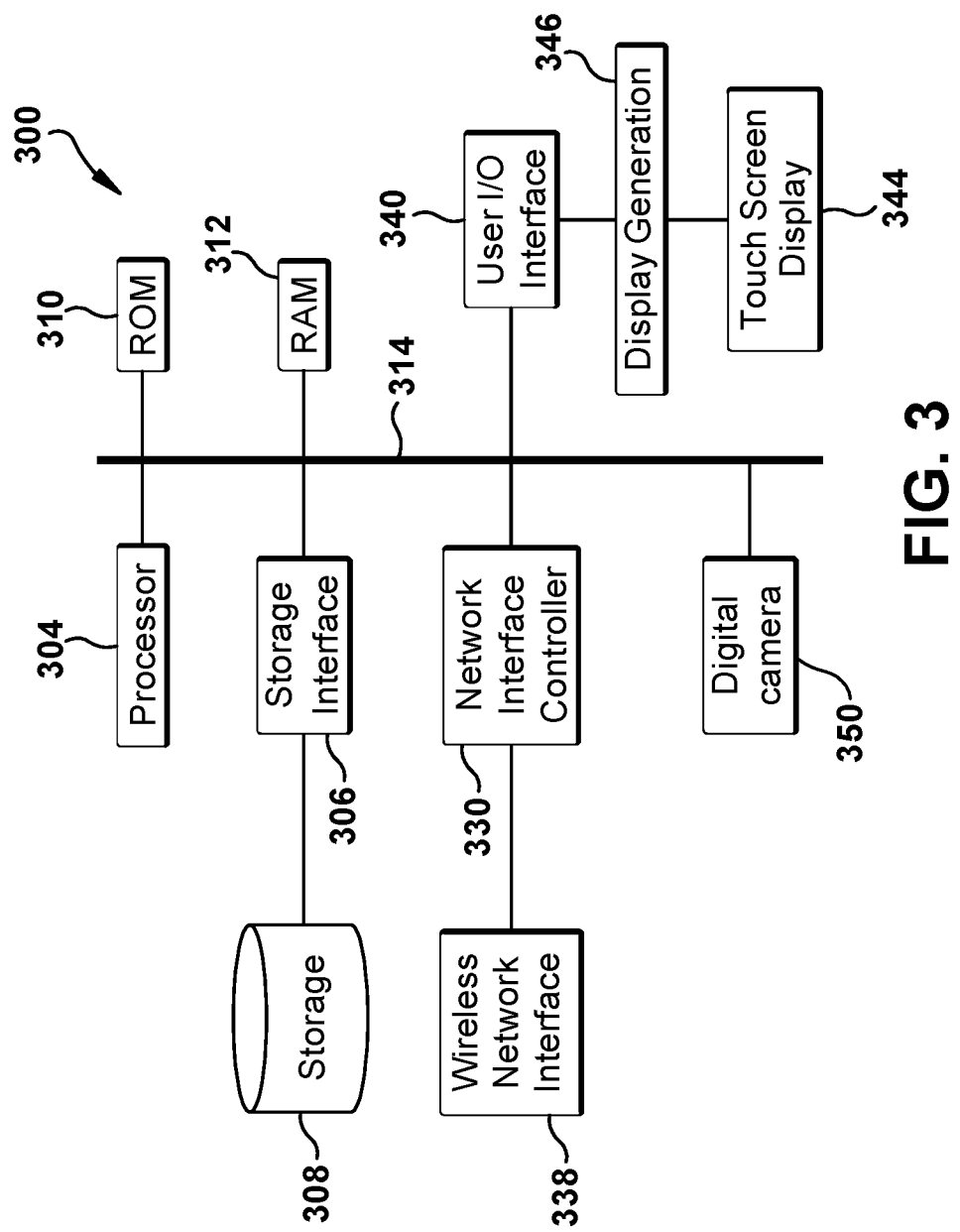
FIG. 3 is an example embodiment of a digital device system.

Turning now to FIG. 3, illustrated is an example embodiment of a digital data processing device 300 such as the machine learning/problem classification system server 128 of FIG. 1. Components of the digital data processing device 300 suitably include one or more processors, illustrated by processor 304, memory, suitably comprised of read-only memory 310 and random access memory 312, and bulk or other non-volatile storage 308, suitably connected via a storage interface 306. A network interface controller 330 suitably provides a gateway for data communication with other devices, such as via wireless network interface 338. A user input/output interface 340 suitably provides display generation via display generator 346 providing a user interface via touchscreen display 344, suitably displaying images from display generator 346. It will be understood that the computational platform to realize the system as detailed further below is suitably implemented on any or all of devices as described above.

FIG. 4 illustrates an example table 400 of operator misclassifications which can degrade performance of a predictive maintenance system by including failures unrelated to hardware in the training data set. Common hardware problems in MFPs include PJ (Paper jam), CQ (Copy quality) and EC (Error code). In the illustrated table, records 404, 404, 412 and 416 each include a misclassified problem code 420, a problem description 424 used to provide correct problem code 427 as noted above and detailed further, below.

A typical failure database has both problem code and description, as well as the resolution code and description. Even though the operator may misclassify the code, the description has more text that can be used to correct the code. For example, a paper jam problem usually includes words like jam or crooked. Copy quality problems usually include words like streak, smear, lines, dirty, etc.

Figure 5:
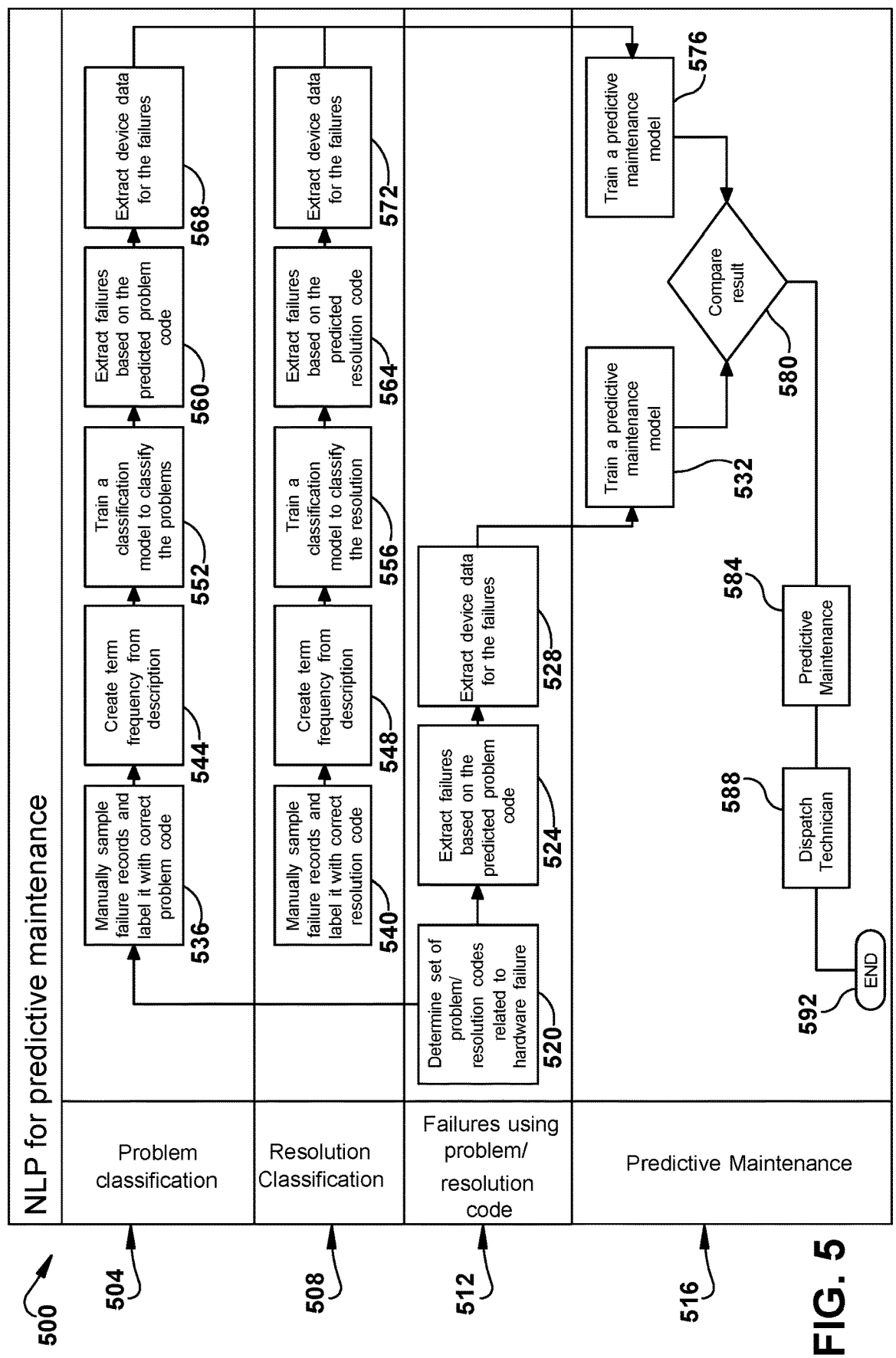
FIG. 5 is an example embodiment of a flowchart providing neuro-linguistic programming for predictive device maintenance.

FIG. 5 illustrates flowchart 500 providing neuro-linguistic programming for predictive device maintenance. Included are a problem classification system 504, a resolution classification system 508, a failure prediction system 512 using problem/solution codes and a predictive maintenance system 516. At block 520, problem and resolution codes are obtained, and expected failures associated with such codes determined at block 524. Device information is received from MFPs at block 528, and the resultant data is used at block 532 to train a predictive maintenance model. It will be noted that in this instance, no correction is made to assigned error codes or classifications providing problematic information for predictive modelling.

Data received at block 520 is also sent to block 536 of the problem classification system 504. Problem classification is initially completed manually at block 536 with assuredly correct problem code assignments and associated verbal descriptions. Corresponding resolution records are sampled and coded at block 540. Natural language terms for problems are sampled and assigned a use frequency at block 544. Corresponding natural language terms for solutions are sampled and assigned a frequency of use at block 548. Problem codes and associated natural language trains a problem classification model at block 552. Corresponding resolution codes and natural language trains a resolution classification model at block 556. Problem failures are extracted from a trained problem model based on a predicted problem code at block 560. Corresponding problem resolutions are extracted from a trained resolution model at block 564. Device data is extracted from MFPs associated with problem records at block 568. Corresponding device data associated with failure resolutions is extracted at block 572. Data from both blocks 568 and 572 is used to train predictive maintenance model at block 576.

Accuracy of the predictive maintenance model 532 is suitably compared to that of model 576. Either or both model results are used to generate predictive maintenance data at block 584, which information dispatches a repair technician at block 588. The process suitably ends at block 592.

Figure 6:
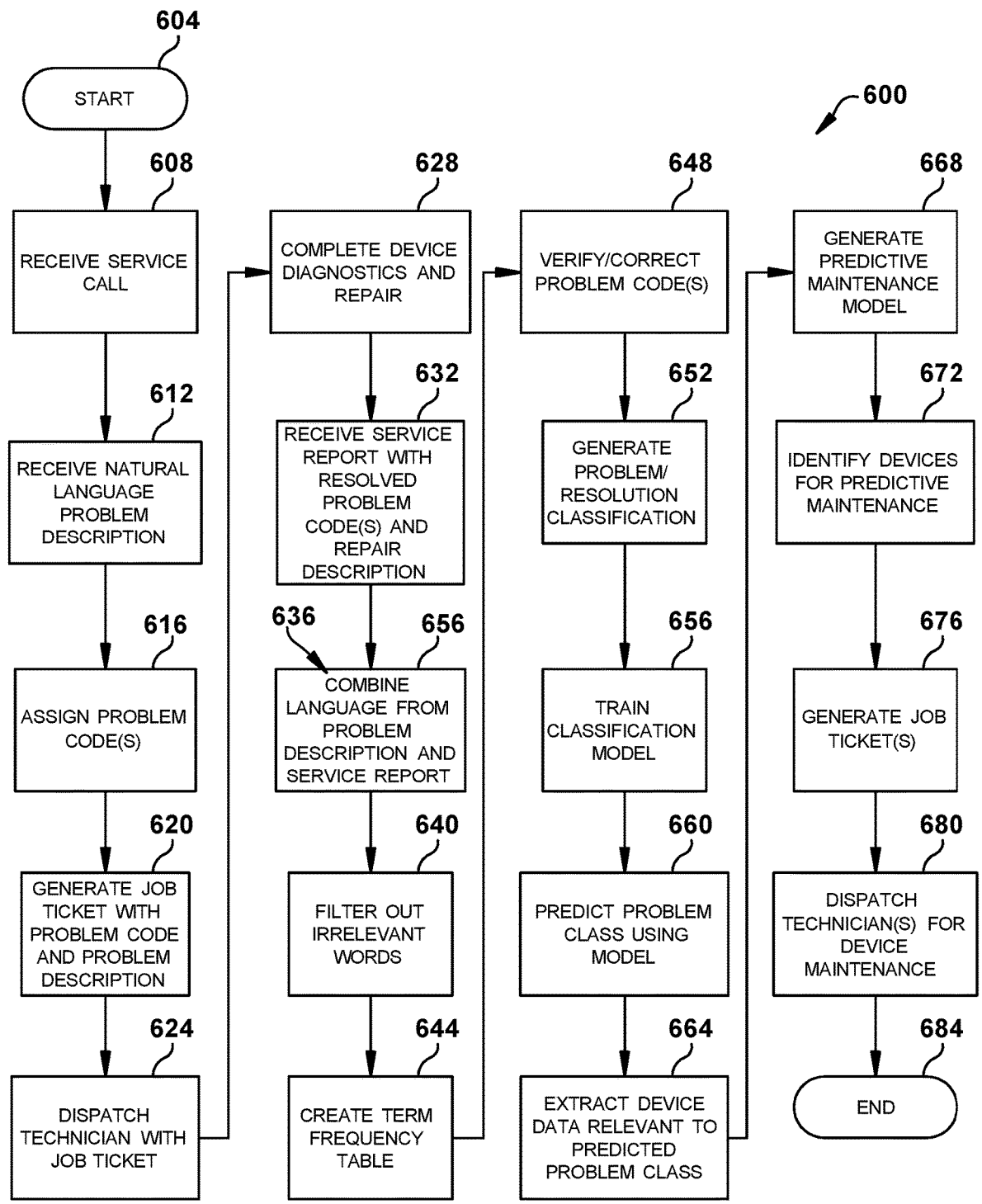
FIG. 6 is an example embodiment of a flowchart for modeling and implementing predictive device maintenance for multifunction peripherals.

FIG. 6 is a flowchart 600 for modeling and implementing predictive device maintenance for multifunction peripherals or the like. The process commences at block 604 and proceeds to block 608 when a service call is received. Natural language associated with a problem description is received at block 612 and one or more problem codes are assigned at block 616. A job ticket is generated at block 620 and a technician is dispatched at block 624. The associated device is diagnosed and repaired at block 628, and a service report is generated at block 632. Language from the job ticket and service report is combined at block 636, and common words that are not helpful relative to diagnoses or repair are filtered out at block 640. A term frequency table is created at block 644 and verified or corrected problem codes are assigned at block 648 and associated as a problem/resolution record at block 652. This record is used to train a classification model at block 656, which model is used to predict a problem class at block 660. Corresponding device data is obtained at block 664, and a predictive maintenance model is generated at block 668. Devices with predicted maintenance needs are identified at block 672 and corresponding job tickets are generated at block 676. One or more service technicians are dispatched at block 680 for device maintenance. The process suitably ends at block 684.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
  a processor;
  memory configured to store a plurality of problem/resolution classifications associated with servicing of multifunction peripherals, each problem/resolution classification including a received problem code and corresponding encoded natural language associated with a problem/resolution description;
  an interface configured to receive natural language input and an assigned problem code associated with a multifunction peripheral maintenance request on described by the natural language input, wherein the interface is comprised of a user interface configured to receive the natural language input and a classification code from an associated user;
  the processor configured to select a stored problem/resolution classification in accordance with a comparison of received natural language input and the encoded natural language;
  the processor further configured to change the received problem code to a verified problem code associated with a selected problem/resolution classification;
  the processor further configured to classify a maintenance request with the selected problem/resolution classification;

the processor further configured to communicate classified, received natural language, the verified problem code and device data from a multifunction peripheral associated with the maintenance request to a machine learning system of a predictive device maintenance system; and wherein the processor is further configured to receive at least a portion of the selected problem/resolution classification from manually input device failure records, each device failure record including one or more user assigned problem codes.

2. The system of claim 1 wherein the processor is further configured to generate the stored problem/resolution classification in accordance with classified device service records received after device servicing.

3. The system of claim 1 wherein the received natural language is comprised of one or both of data from a device repair ticket and data from a device service report.

4. The system of claim 3 wherein the received natural language and associated, the verified problem code is communicated as training data for a corrected data predictive maintenance model of the predictive device maintenance system.

5. The system of claim/wherein the processor is further configured to:
communicate the natural language input, the assigned problem code and device data as training data to a uncorrected data predictive maintenance model,
compare accuracy of the corrected data predictive maintenance model relative to accuracy of the uncorrected data predictive maintenance model, and
implement a predictive maintenance model having greater accuracy.

6. The system of claim 5 wherein the processor is further configured to:
determine predictive device failures by an implemented predictive maintenance model,
generate a repair ticket for devices associated with the predictive device failures, and
dispatch one or more service technicians for preemptive repair of the devices.

7. A method comprising:
storing, in a memory, a plurality of problem/resolution classifications associated with servicing of multifunction peripherals, each problem/resolution classification including a problem code and corresponding encoded natural language associated with a problem/resolution description;
receiving, via an interface, natural language input and an assigned problem code associated with a multifunction peripheral maintenance request on described by the natural language input;

receiving the natural language input and classification code from an associated user;
selecting a stored problem/resolution classification in accordance with a comparison of received natural language input and the encoded natural language;
changing the assigned problem code to a verified problem code associated with a selected problem/resolution classification;
classifying a maintenance request with the selected problem/resolution classification;
communicating classified, received natural language, the verified problem code and device data from a multifunction peripheral associated with the maintenance request to a machine learning system of a predictive device maintenance system; and
receiving at least a portion of the selected problem/resolution classification from manually input device failure records, each device failure record including one or more user assigned problem codes.

8. The method of claim 7 further comprising generating the stored problem/resolution classification in accordance with classified device service records received after device servicing.

9. The method of claim 7 wherein the received natural language is comprised of one or both of data from a device repair ticket and data from a device service report.

10. The method of claim 9 wherein the received natural language and associated, the verified problem code is communicated as training data for a corrected data predictive maintenance model of the predictive device maintenance system.

11. The method of claim 10 further comprising:
communicating the natural language input, the assigned problem code and device data as training data to a uncorrected data predictive maintenance model;
comparing accuracy of the corrected data predictive maintenance model relative to accuracy of the uncorrected data predictive maintenance model, and
implementing a predictive maintenance model having greater accuracy.

12. The method of claim 11 further comprising:
determining predictive device failures by an implemented predictive maintenance model,
generating a repair ticket for devices associated with predictive device failures, and
dispatching one or more service technicians for preemptive repair of the devices.

\* \* \* \* \*